(No Model.)

C. P. MANEE & E. J. PALMER.
VEHICLE SPRING.

No. 379,234. Patented Mar. 13, 1888.

Witnesses.
John C. Perkins
Oscar J. Faltrell

Inventor.
Chas. P. Manee & E. Jerome Palmer.
By Lucius C. West,
Atty.

UNITED STATES PATENT OFFICE.

CHARLES P. MANEE AND E. JEROME PALMER, OF KALAMAZOO, MICHIGAN.

VEHICLE-SPRING.

SPECIFICATION forming part of Letters Patent No. 379,234, dated March 13, 1888.

Application filed October 15, 1887. Serial No. 252,479. (No model.)

*To all whom it may concern:*

Be it known that we, CHARLES P. MANEE and E. JEROME PALMER, citizens of the United States, residing at Kalamazoo, county of Kalamazoo, State of Michigan, have invented a new and useful Vehicle Spring, of which the following is a specification.

This invention relates to that class of vehicle-gears in which a semi-elliptical spring on the axle is employed in a manner to allow the vehicle-body to be borne down below the plane of said spring; and the invention has for its object the construction of the below described and claimed spring, designed to effect other useful results in addition to that above named.

Figure 1:
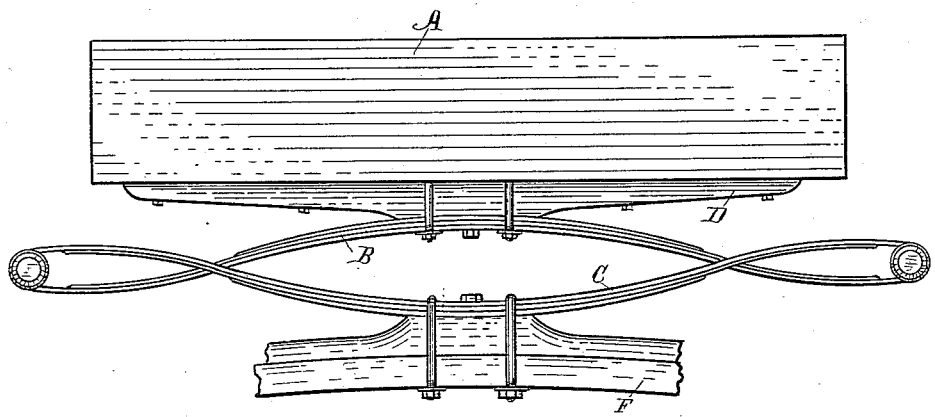
Figure 2:
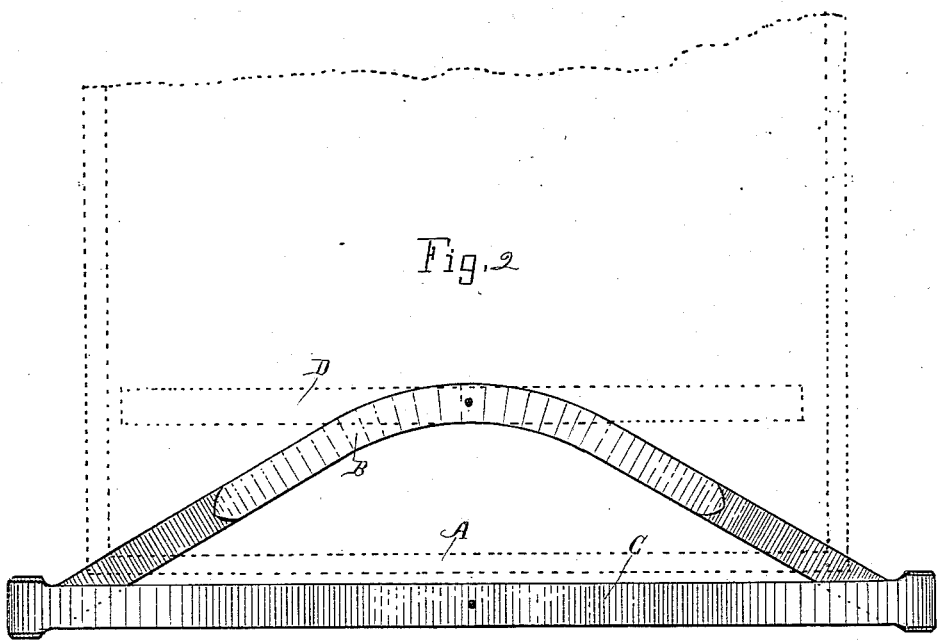

In the drawings forming a part of this specification, Figure 1 is an end elevation of a vehicle in which a side elevation of the spring appears, the vehicle axle being broken; and Fig. 2 is an under plan of the spring.

Referring to the lettered parts of the drawings, the spring consists of two semi-elliptical members, B C, when viewed in side elevation, as in Fig. 1. The ends of the upper member, B, are made to come below the ends of the lower member, C, and are coupled therewith, the same as the ends of the ordinary elliptical spring are coupled. The upper member, B, is bent edgewise, so as to bow back away from the lower member, as indicated in Fig. 2. The central portion of this bowed portion supports the body of the vehicle. The idea is illustrated by the bolster D of the body A, centrally attached to the part B. In Fig. 2 the dotted position of one end of the body A shows the latter just clearing the edge of the lower member, C. The peculiar bend given the upper member in plan view causes it to constitute a brace against the lateral and endwise swaying of the body. The central portion of the upper member, B, may be substantially parallel with the horizontal plane of the bolster D, or it may be on a curve, as in Fig. 2, and the seat for the same in the bolster D may be semi-elliptic, as indicated by the curved part of said central portion, which covers the dotted bolster in said Fig. 2.

It will be understood that in a four-wheeled vehicle both ends of the body are supported by a spring, as here shown for one end.

Having thus described our invention, what we claim as new, and desire to secure by Letters Patent of the United States, is—

A vehicle-spring composed of two semi elliptical members having the ends of the upper member hinged to the ends of the lower member on the under side of the latter, said lower member being horizontally straight in plan view and for attachment to the axle, and the upper member being bowed edgewise from the lower member, forming a portion to sustain the vehicle-body, substantially as set forth.

In testimony of the foregoing we have hereunto subscribed our names in presence of two witnesses.

CHARLES P. MANEE.
E. JEROME PALMER.

Witnesses:
RUFUS SCOTT,
JOHN G. GLOVER.